MAGNETIC RECORDING OF VIDEO SIGNALS

Filed June 29, 1962

INVENTORS
WILLEM VAN DEN BUSSCHE
FRANCISCUS TH. BACKERS
HERMAN K ADRIAAN de LANGE

AGENT

United States Patent Office 3,251,934
Patented May 17, 1966

3,251,934

MAGNETIC RECORDING OF VIDEO SIGNALS

Willem van den Bussche, Franciscus Theodorus Backers, and Herman Kasper Adriaan de Lange, all of Emmasingel, Eindhoven, Netherlands, assignors to North American Philips Company, Inc., New York, N.Y., a corporation of Delaware Filed June 29, 1962, Ser. No. 206,336
Claims priority, application Netherlands, July 13, 1961, 267,066
4 Claims. (Cl. 178—6.6)

This invention relates to methods and apparatus for recording or reproducing high-frequency signals on a magnetic carrier; in particular, it relates to recordings comprising a video-signal including a picture signal and synchronizing signals. In known devices of this kind, the recordings are recorded on a carrier wound helically round a stationary drum, the recording being accomplished by means of a magnetic head rotating in a slot of the said drum in a plane at right angles to the axis thereof; the field period of the video-signal is a whole multiple of the revolution period of the head and the recorded signal is interrupted during each revolution period of the head and at a pre-determined position of the head.

In such a method the recordings usually comprise the lower side-band of a carrier wave modulated in frequency by the video-signal. The carrier wave may be, for example, 6 mc./s. and the said lower side-band extends in practice from 1 mc./s. to 6 mc./s.

The tracks recorded on the carrier by the head extend across the carrier in parallel and in a direction inclined to the longitudinal direction of the carrier.

Audio-signals and reference signals are also recorded in practice in addition to video signals. Reference signals are used to ensure that the head scans the same parts of the carrier during reproduction as during recording.

The audio-signal and the reference signal are generally recorded in the direction of the length of the carrier on tracks situated in the margin of the carrier. This means that the video-tracks cannot extend from edge to edge of the carrier, with the result that the recorded signal is interrupted during each revolution period of the head and at a predetermined position of the head.

The revolution period of the head in known methods is chosen so that the field period of the video-signal is a whole multiple of the revolution period and in particular equal to the revolution period. Consequently, during each revolution period of the head, at least one frame-synchronizing pulse occurs in addition to the above-mentioned interruption in the recording.

In known methods measures are taken to ensure that the said interruption coincides with the blanking period of such a frame-synchronizing pulse.

According to one aspect of the invention, for the reasons set forth below, means are provided for the said interruption to occur just before the occurrence of a frame-synchronizing pulse.

In order to fully appreciate the significance of the steps taken in accordance with the invention, the following should be noted:

(1) If, as in the prior art, the interruption occurs during the blanking period of the frame-synchronizing pulse, in other words if the active portion of the frame-synchronizing pulse occurs before the interruption, any influences which cause the discontinuity resulting from the interruption in the series of line-synchronizing pulses to be variable, will interfere with the quality of the picture reproduced; such influences may be, for example, an extension of the carrier or thermal expansion of the drum. The line-synchronization of the equipment dealing with the signal being read is in this case adjusted during a period in which picture information is present again. However, if the interruption occurs before the frame-synchronizing pulse, the line synchronization is adjusted during the blanking period of a frame-synchronizing pulse and this adjustment is either substantially terminated when the read signal again contains picture information, or plays a part at most during the upper lines of the displayed picture. This is no essential objection since in practice the upper lines are invisible because of the field of the viewing screen of a display tube.

(2) Since in the method according to the invention there is no interruption between the active portion of the frame-synchronizing pulse and the succeeding line-synchronizing pulses, the relationship between frame- and line-synchronizing pulses is not disturbed in the read signal so that the interlacing remains correct. If the interruption, as in the prior art, occurs during the blanking period of the frame-synchronizing pulse, the said relationship may be disturbed due to extension, thermal expansions, etc.

(3) Since in practice the lower lines of a displayed picture are invisible due to the field of the viewing screen of a display tube, it is hardly objectionable for the interruption to occur during a period in which video-information is present in the read signal. If, however, the interruption should occur, wholly or in part, in the visible part of the picture and if the interruption becomes manifest in the reproduced video-signal as a pulse projecting above the white level of the video-signal and as such gives rise to a white edge below in the picture, then according to a further aspect of the invention, in order to avoid this disadvantage, the interference caused in the read signal by the interruption is compensated so that the level of the interference in the resulting video-signal lies between the white level and the level of the tops of the synchronizing pulses.

In this connection it is to be noted that the interruption in the reproduced video-signal may alternatively become manifest as a pulse projecting above the level of the tops of the synchronizing pulses, with the resulting possibility that the device for field synchronization may respond to the interruption instead of the frame-synchronizing pulse.

According to a further aspect of the invention, the interference caused in the read signal by the interruption is compensated so that the level of the interference in the resulting video-signal lies below the level of the tops of the synchronizing pulses.

Briefly, a device in accordance with the invention comprises a magnetic head for recording the recordings on, or reproducing them from, a magnetic carrier wound helically round a stationary drum which has a slot in which the magnetic head can rotate at right angles to the axis of the drum, means are also provided to ensure that the field period of the video-signal is a whole multiple of the revolution period of the head and the recorded signal is interrupted during each revolution period of the head and at a predetermined position of the head. In addition, the phase relationship between the rotation of the head and the video-signal is such that the said interruption occurs just before the occurrence of a frame-synchronizing pulse.

In order that the invention may be readily carried into effect, it will now be described in detail, by way of example, with reference to the accompanying diagrammatic drawing, in which.

Figure 1:
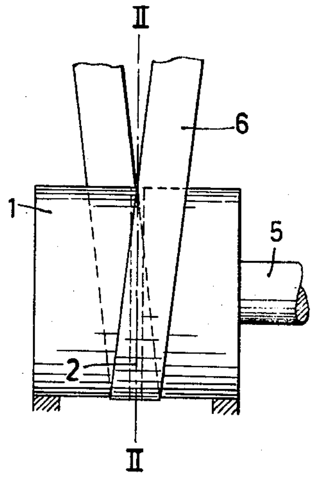
FIGURE 1 is a diagrammatic view of part of a device for carrying out the invention.
Figure 2:
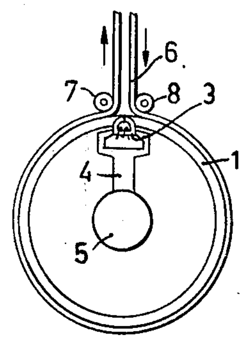
FIGURE 2 is a cross-sectional view taken along the line II—II; of the component part of FIGURE 1.
Figure 3:
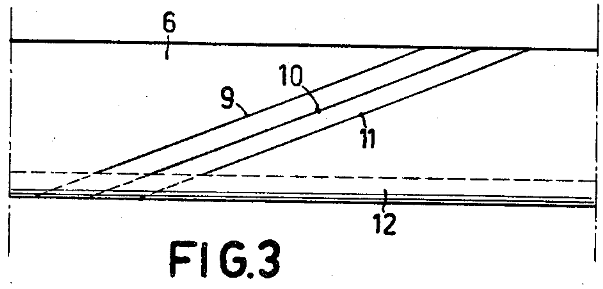
FIGURE 3 shows part of the carrier of FIGURES 1 and 2 on a larger scale.

FIGURES 1 and 2 show a stationary drum 1 having a slot 2 in which a video-head 3 is secured to an arm 4 and rotatable about a spindle 5. A magnetic carrier 6 is helically wound round the drum 1 through an angle of almost 360°; the carrier passes around guide members 7 and 8 which are arranged at a small distance from each other. The video-head 3 records tracks on the carrier which extend in parallel and in an inclined or oblique direction across the tape. FIGURE 3 shows part of the tape on a larger scale. Three such tracks are indicated by 9, 10 and 11 respectively.

The revolution period $T_r$ of the spindle 5, i.e., the rotational period of the head 3, is such that the field period of the video-signal is a whole multiple of $T_r$. In practice the field period is equal to $T_r$, in other words, a whole frame is recorded on a track.

The terms "field" and "field period" might suggest the invention to be limited to those cases where the video-information is built up according to a standard whereby a picture consists of a plurality of interlaced fields. However, the invention is not limited to this condition. If interlacing is not used, the image, within the scope of the invention, is assumed to be built up of only one field. A track as shown in FIGURE 3 is not recorded completely in practice; a strip 12 on which the audio-signal and the reference signal may be recorded is left free at one edge or both edges of the carrier. Such a strip may be left free from video-information in different ways. From FIGURES 1 and 2 it may be seen that a margin 12 of the carrier is automatically left free from information due to the finite distance between the guide members 7 and 8, recording not taking place if the head occupies a position between the members 7 and 8. However, it is alternatively possible for the tape to be provided round the drum so that a complete track is recorded with video-information. In this case video-information is removed from a strip 12 by means of an erasing head.

However, regardless of the manner in which such a blank strip is obtained, the recorded video-information is interrupted during each revolution period of the head 3.

According to the invention, means are provided to ensure that the interruption occurs just before the occurrence of a frame-synchronizing pulse in the video-signal.

Such a relationship between interruption and frame-synchronizing pulse may be obtained by suitable adjustment of those parts of the device for recording or reproducing magnetic recordings which determine the phase relationship between the video-signal and the rotation of the spindle 5 during recording.

Figure 4:
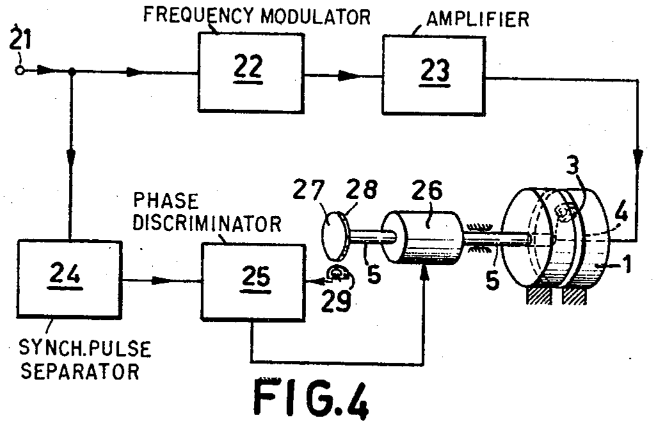
FIGURE 4 shows a block diagram of an embodiment of that portion of a device according to the invention which relates to the determination of the phase relationship between the rotation of the head and the video-signal.

FIGURE 4 shows a block diagram of one embodiment of that portion of a device according to the invention which relates to determining this phase relationship.

The video-signal to be recorded is applied to a terminal 21 which is connected to a frequency modulator 22 in which the video-signal is modulated on a suitable carrier wave and in which the carrier wave thus modulated is also limited in amplitude. The output signal from the modulator is applied through an amplifier 23 to the head 3 which, as in FIGURES 1 and 2, is coupled to a spindle 5 by means of an arm 4.

The terminal 21 is also connected to a synchronizing-pulse separator 24 which restores the frame-synchronizing pulse from the video-signal. The output signal from separator 24 is applied to a phase discriminator 25 having also applied to it a signal containing information about the position of the arm 4 with respect to the stationary drum 1. This information may be obtained in the following manner. The spindle 5, which is driven by an electric motor 26, carries a disc 27, provided on its edge at a given area with a piece 28 of ferromagnetic material which, during each revolution, induces a pulse in a reproducing head 29 mounted near the edge. The induced pulses are compared with the frame-synchronizing pulses in the phase discriminator 25, the resulting phase-difference signal controlling the electric motor 26. The place of the piece 28 of ferromagnetic material on the edge of the disc 27 determines, at a given position of the head 29 and a given place of interruption, the place of the interruption in the recorded signal with respect to this signal. According to the invention, the adjustment is such that the interruption occurs just before the occurrence of a frame-synchronizing pulse.

As previously mentioned, the interruption may cause difficulty under certain conditions. If, for example, the video-signal modulates the carrier wave in frequency so that the tops of the synchronizing signals correspond to the lowest sweep frequency of the carrier wave and if the demodulator to which the read signal is applied has a demodulation edge increasing with frequency, the interruption in the demodulation product generally becomes manifest as a pulse projecting above the level of the tops of the synchronizing pulses.

A similar result is obtained if the video-signal modulates the carrier wave in frequency so that the white level of the video-signal corresponds to the lowest sweep frequency of the carrier wave and if the demodulator to which the read signal is applied has a demodulation edge decreasing with frequency.

It will be evident that such a pulse may exert a highly interfering action upon the frame-synchronizing device of the equipment dealing with the signal being read.

According to the invention, in such cases the interference caused in the read signal by the interruption is compensated so that the level of the interference in the resulting video-signal lies below the level of the tops of the synchronizing pulses, preferably below the black level.

If the interruption should occur, wholly or in part, in the visible portion of the image, the compensation must not be such that the resulting pulse projects above the white level.

It is to be noted that for other reasons also it may be objectionable for a pulse to project above the white level, for example if the reproduced video-signal has to be transmitted again.

If the video-signal modulates the carrier wave in frequency so that the tops of the synchronizing signals correspond to the lowest sweep frequency of the carrier wave and if the demodulator to which the read signal is applied has a demodulation edge decreasing with frequency, or if the video-signal modulates the carrier wave in frequency so that the white level corresponds to the lowest sweep frequency and if the demodulator has a demodulation edge increasing with frequency, the interruption becomes manifest in the demodulation product as a pulse projecting above the white level of the video-signal.

If this pulse occurs in the visible part of the image, the interference caused in the read signal by the interruption is compensated so that the level of the interference of the resulting video-signal lies between the white level of the tops of the synchronizing pulses.

The choice of the last-mentioned limit is determined by the fact that the pulse resulting from the compensation must not project above the tops of the synchronizing signals in order to avoid having this pulse interfere with the frame-synchronizing device of the equipment dealing with the signal being read. In this connection the compensation is preferably carried out so that the level of the interference lies between white level and black level, for example on the black level itself, or on a suitable grey level.

It should be noted that the interruption may give rise to similar interference as mentioned above, even if the recorded signal comprises a carrier wave modulated in amplitude by the video-signal, or the video-signal itself.

Compensations as described above may be effected in various ways as follows:

A first method is, for example, to apply the reproduced video-signal to an amplitude selector cutting off those portions of the signal which project above the white level or above the tops of the synchronizing pulses and to apply the resulting pulses with opposite polarity to the reproduced video-signal with an amplitude such that the resulting pulse has a suitable level between the white level and the level of the tops of the synchronizing pulses, or below the tops of the synchronizing pulses.

Another method, which may be used if the recorded signal comprises a frequency-modulated carrier wave, consists in applying the signal being read to a self-oscillating demodulator which, in the absence of input signal: the interruption, produces itself an oscillation providing a direct-current signal as a demodulation product. Such a demodulator, which is known per se, comprises a controlled oscillator which is activated by the signal applied to the oscillator and a demodulation circuit coupled to the output of the oscillator. If the amplitude of the control frequency becomes unduly small, the oscillator starts oscillating in its natural frequency. Suitable adjustment of this natural frequency permits a signal to be obtained across the output of the demodulation circuit which has a suitable level determined by prevailing circumstances.

While the invention has been described in conjunction with specific embodiments, various modifications will be readily apparent to those skilled in the art without departing from the inventive concept, the scope of which is set forth in the appended claims.

What is claimed is:

1. Apparatus for recording and/or reproducing video signals on a magnetic record carrier, comprising: at least one magnetic head, a hollow stationary drum having a slot in the surface thereof and having a longitudinal axis, means for rotating said head in said drum in close proximity to said slot in a plane at right angles to the axis of the drum, a moving magnetic record carrier wound helically on said drum in the vicinity of said slot and magnetically co-acting with said head, the rotating head and the moving carrier thereby forming a plurality of parallel magnetic tracks containing video signals on the carrier, the field period of the video signal being a whole multiple of the revolution period of the head and each track being interrupted during each revolution of the head and at a predetermined position of the head, and means for controlling said motor in response to the video signal to maintain the phase relationship between the rotation of the head such that said interruption occurs just prior to the occurrence of a field-synchronizing pulse.

2. Apparatus for recording and/or reproducing video signals on a magnetic record carrier, comprising: at least one magnetic head, a hollow stationary drum having a slot in the surface thereof and having a longitudinal axis, means for rotating said head in said drum in close proximity to said slot in a plane at right angles to the axis of the drum, a moving magnetic record carrier wound helically on said drum in the vicinity of said slot and magnetically co-acting with said head, the rotating head and the moving carrier thereby forming a plurality of parallel magnetic tracks containing video signals on the carrier, the field period of the video signal being a whole multiple of the revolution period of the head and each track being interrupted during each revolution of the head and at a predetermined position of the head, and means for controlling said motor in response to the video signal to maintain the phase relationship between the rotation of the head and the video signal such that said interruption occurs just prior to the occurrence of a field-synchronizing pulse, the output channel of the reproduction device including means compensating for the interference caused in the read signal by the interruption so that the level of the interference in the resulting video signal lies between the white level and the level of the tops of the synchronizing signals.

3. Apparatus for recording and/or reproducing video signals on a magnetic record carrier, comprising: at least one magnetic head, a hollow stationary drum having a slot in the surface thereof and having a longitudinal axis, means for rotating said head in said drum in close proximity to said slot in a plane at right angles to the axis of the drum, a moving magnetic record carrier wound helically on said drum in the vicinity of said slot and magnetically co-acting with said head, the rotating head and the moving carrier thereby forming a plurality of parallel magnetic tracks containing video signals on the carrier, the field period of the video signal being a whole multiple of the revolution period of the head and each track being interrupted during each revolution of the head and at a predetermined position of the head, and means for controlling said motor in response to the video signal to maintain the phase relationship between the rotation of the head and the video signal such that said interruption occurs just prior to the occurrence of a field-synchronizing pulse, the output channel of the reproduction device including means compensating for the interference caused in the read signal by the interruption so that the level of the interference in the resulting video signal lies between the white level and the level of the tops of the synchronizing signals, the reproduced video signal being applied to an amplitude selector cutting off those parts of the signal which project above the white level, the resulting pulses being applied with opposite polarity and with suitable amplitude to the reproduced video signal.

4. Apparatus for recording and/or reproducing video signals on a magnetic record carrier, comprising: at least one magnetic head, a hollow stationary drum having a slot in the surface thereof and having a longitudinal axis, means for rotating said head in said drum in close proximity to said slot in a plane at right angles to the axis of the drum, a moving magnetic record carrier wound helically on said drum in the vicinity of said slot and magnetically co-acting with said head, the rotating head and the moving carrier thereby forming a plurality of parallel magnetic tracks containing video signals on the carrier, the field period of the video signal being a whole multiple of the revolution period of the head and each track being interrupted during each revolution of the head and at a predetermined position of the head, the recorded signal comprising a frequency-modulated carrier wave, and means for controlling said motor in response to the video signal to maintain the phase relationship between the rotation of the head and the video signal such that said interruption occurs just prior to the occurrence of a field-synchronizing pulse, the output channel of the reproduction device including means compensating for the interference caused in the read signal by the interruption so that the level of the interference in the resulting video signal lies between the white level and the level of the tops of the synchronizing signals, the read signal being applied to a self-oscillating demodulator which produces, in the absence of an input signal, an oscillation whose frequency is adjusted such that the output signal has a level which lies between the white level and the level of the tops of the synchronizing signals.

References Cited by the Examiner

UNITED STATES PATENTS 2,773,120 12/1956 Masterson ---------- 178—6.6

DAVID G. REDINBAUGH, *Primary Examiner.*

H. W. BRITTON, *Assistant Examiner.*